2,997,312
BRAKE SYSTEM FOR VEHICLES

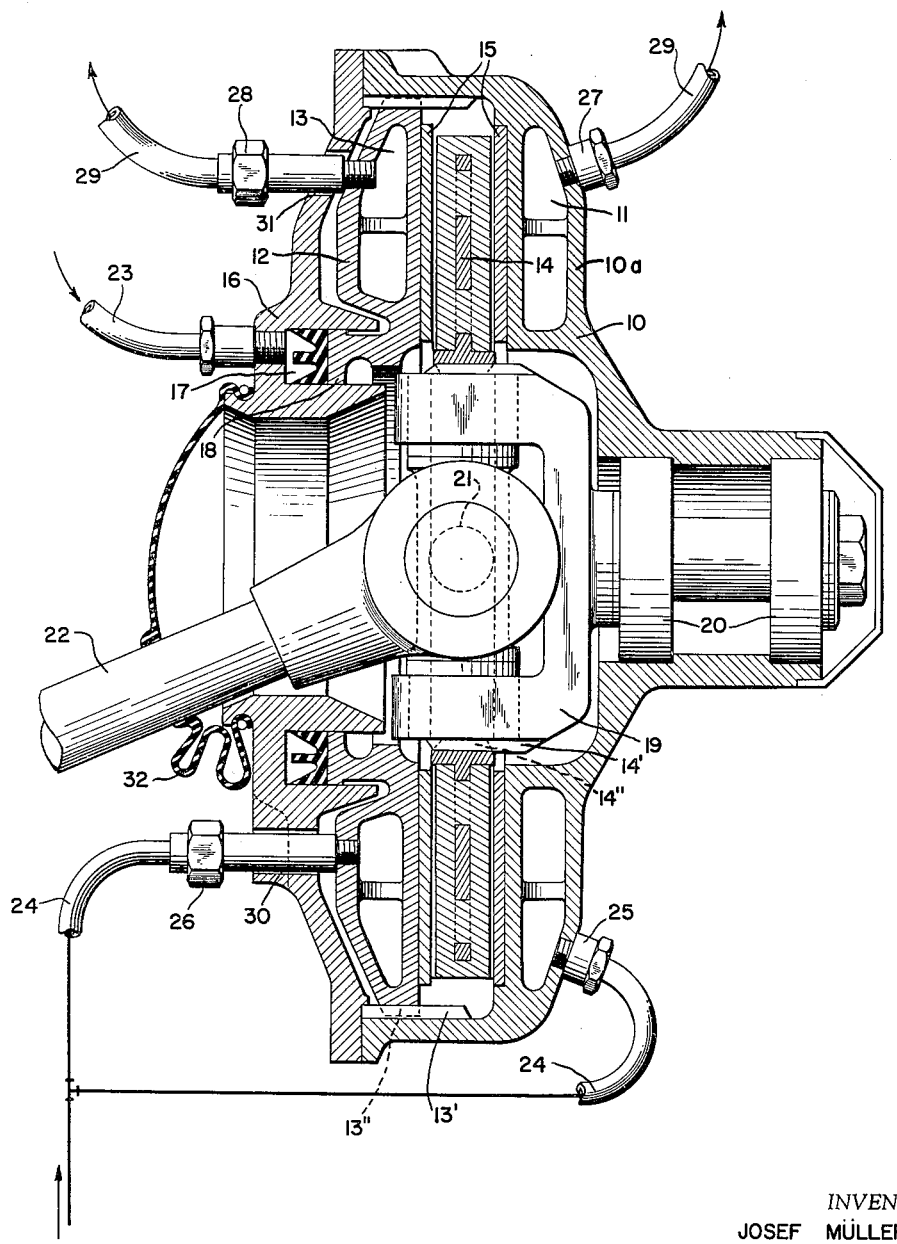

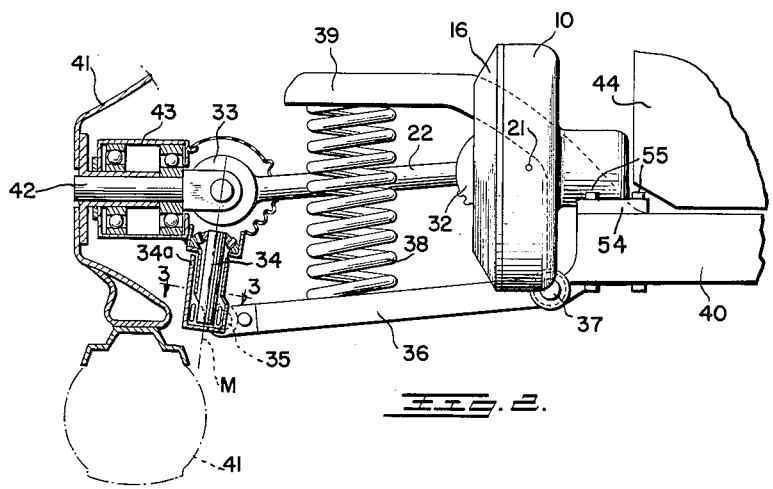
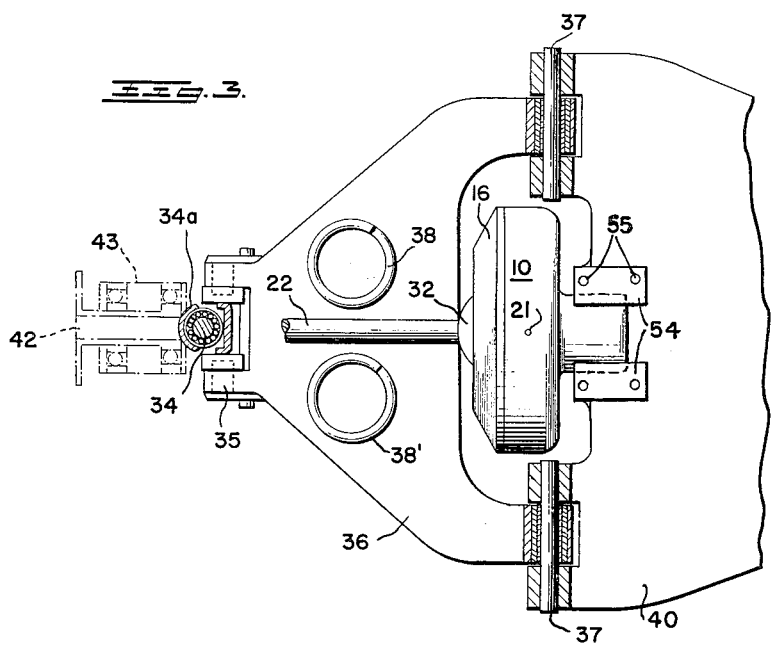
INVENTORS
JOSEF MÜLLER
JOSEPH DAUBEN

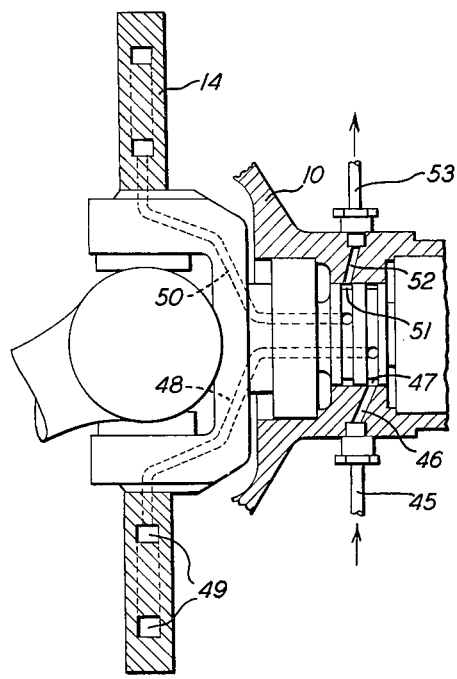

Josef Müller, Stuttgart-Riedenberg, and Joseph Dauben, Stuttgart, Germany, assignors to Daimler-Benz Aktiengesellschaft, Stuttgart-Unterturkheim, Germany
Filed Aug. 9, 1956, Ser. No. 602,966
Claims priority, application Germany Aug. 13, 1955
11 Claims. (Cl. 280—96.2)

The present invention relates to a brake system for vehicles, and more particularly to an arrangement of water-cooled disk brakes for motor vehicles and the connection of the brakes with the respective wheels.

Motor vehicle brakes of the usual construction possess, as a rule, brake shoes which are forced against the brake drum, for example, by hydraulic means, and in which the heat produced by the braking action is conducted away by means of cooling air. However, during longer periods of braking, especially in mountainous terrain, such as arrangement for conducting away the heat becomes inadequate so that the brakes become hot and exhibit a so-called "fading" effect, i.e., they no longer operate properly when the brake pedal is applied. With particularly high temperatures, as a rule above 450°, the brake shoe lining becomes soft and is rapidly destroyed. It has been proposed heretofore to avoid these disadvantages by the use of disk brakes. However, at best only the "fading" can be avoided to a greater or lesser degree, however, with higher temperatures the brake linings of disk brakes are also susceptible to be destroyed.

Accordingly, the present invention seeks, in particular, to achieve a greater reliability in the operation and longer working life of the brakes, and consists essentially in that the brake is connected to a cooling circuit system, particularly the cooling circuit system of the vehicle drive aggregate, such as the engine. In such a construction, the heat produced by the brake may be led off or conducted away over a cooler or radiator, especially over the radiator of the driving engine, without having to fear evaporation of the water. A replenishing of the water is also unnecessary. In addition thereto, no water incrustation takes place. Moreover, the overall heat performance of the engine is considerably improved, especially in the winter. This is the case, for example, during long down-hill drives during which the engine does not have to work, i.e., operates under essentially no-load conditions, and the cooling water has, therefore, a tendency to cool off rapidly. Consequently, by an arrangement in accordance with the present invention, a particularly intensive cooling of the brake is made possible, on the one hand, and an excessive cooling of the engine is counteracted by the heat given off by the brake so that during subsequent loading again of the engine, for example, by depressing the accelerator pedal again, the engine finds itself immediately again within its most favorable temperature range. If the heat for the heating system is provided by the heated cooling water, an arrangement in accordance with the present invention also offers simultaneously therewith the advantage that sufficient heat is available for the heating system even during long down-hill drives, especially in the winter.

The brakes are formed appropriately as disk brakes which have proved themselves particularly free of fading, whereby both the stationary as well as the axially displaceable brake disk may be cooled by a cooling liquid. The cooling liquid, for example, is led into the brake disks from below and is conducted away or led off from above. Possibly, the circulation of the cooling liquid may also be increased by a pump.

The brakes are preferably secured to the frame or to the self-supporting body of the vehicle and are connected with the wheels, for example, by a joint shaft serving simultaneously as a guide arm of the wheel or, in case of non-driven wheels, as a brake shaft, however, not as a drive shaft. Such a construction results in the advantage that the unsprung mass may be considerably descreased and possibly a guide arm or link may be dispensed with.

Accordingly, it is an object of the present invention to provide a brake system for motor vehicles which permits adequate cooling thereof so as to avoid excessive heating of the brake linings, especially during downhill drives and to prevent thereby damage to the brake linings.

Another object of the present invention resides in the provision of a disk brake in which the disks are cooled by means of a liquid so as to avoid melting or overheating of the brake linings which might result in serious permanent damage.

A still further object of the present invention is the provision of a brake system which is particularly reliable in operation and exhibits a much longer service life.

A still further object of the present invention is to provide a water-cooling system for vehicle brakes which is so interconnected with the vehicle cooling system that it offsets the disadvantageous over-cooling effect which may occur under engine no-load conditions, particularly when driving downhill, so as to provide adequate heat for the engine even when the same operates under no load.

A further object of the present invention is to provide a vehicle brake system which is such as to reduce the unsprung mass and thereby entails savings in the suspension for the wheels which may be simplified.

Still another object of the present invention is to provide a brake shaft, which, at the same time, forms a guide member for the wheel suspension.

A still further object of the present invention resides in the arrangement of a brake system which has particularly favorable heat transfer characteristics by the particular arrangement of the braking disks and the brake linings and the materials of which the brakes are made.

These and other objects, features and advantages of the present invention will become more obvious from the following description when taken in connection with the accompanying drawing which shows, for purposes of illustration only, one preferred embodiment in accordance with the present invention and wherein:

FIGURE 1 is a longitudinal cross-sectional view through a water-cooled brake in accordance with the present invention;

FIGURE 2 is a view partially in cross-section of the entire wheel suspension in accordance with the present invention utilizing a brake system in accordance with the present invention;

FIGURE 3 is a plan view partially in cross section of the wheel suspension in accordance with the present invention in which the upper outer joint is omitted for the sake of clarity and with the wheel removed from the wheel spindle, and FIGURE 4 is a longitudinal cross-sectional view of another embodiment of the present invention.

Referring now more particularly to the drawing wherein like reference numerals are used throughout the various views to designate like parts, reference numeral 10 designates the brake housing provided with an annularly shaped cooling jacket 11 formed therein, this part of the housing constituting with its inner flat face a stationary brake disc 10a. The brake housing 10 is secured to the frame or vehicle body in any suitable manner, as for example by mounting flanges 54 which are secured to cross bearer 40 by members 55 as shown in FIGURES 2 and 3. The brake disk 12 provided with the annularly shaped cooling-jacket 13 is axially slidable in the housing 10. The brake disk 12 does not partake in any rotary movement, i.e., is non-rotatable, but is permitted to move axially relative to brake housing 10 by means of a spline connection of usual construction and designated by reference numerals 13' and 13". A brake disk 14 which rotates together with the wheel (not shown) in a manner to be described more fully hereinafter is arranged between the two parts 10a and 12 which serve as outer brake or pressure disks and which are provided with ground plane surfaces. The center brake disk 14 cooperates with the brake linings 15 on the parts 10a and 12 to produce the desired braking action. The lid or cover 16 of the stationary housing contains the brake cylinder 17 suitably formed therein in which slides an annular piston 18 which is cast together with the axially displaceable brake disk 12.

The center brake disk 14 is connected with the joint member 19 so as to be axially movable relative thereto, for example, by means of suitable spline connections 14' and 14". The joint member 19 supported in two bearings 20 includes a cardan joint 21 which pivotally connects the brake shaft 22 with the joint member 19 so as to enable universal movement between these two parts.

The feed or supply of the brake fluid, such as braking oil, takes place at 23. The cooling fluid which comes from the engine is admitted or supplied over a line 24 into the cooling jacket 11 through a fixed connection 25 and into cooling jacket 13 through an axially displaceable connection 26. The cooling fluid is conducted away from cooling jackets 11 and 13 in a similar manner, for example, by a fixed connection 27 and an axially displaceable connection 28 secured to the part 12 back to the engine over line 29. The cooler or radiator of the cooling system is preferably arranged or connected in line 24. The connections 26 and 28 extend in an axially displaceable manner through apertures 30 and 31 in the lid or cover 16. It is further possible to connect also the center disc 14 with the cooling circuit and an arrangement illustrating such a construction is shown in FIGURE 4. Here the disc 14 is provided with interior spaces 49 to which cooling fluid is conducted from the cooling system of the vehicle engine through conduits 45, 46, 47 and 48. The cooling fluid is returned to the system through conduits 50, 51, 52 and 53.

The joint shaft 22 which is connected with the wheels (not illustrated) transmits the energy to be dissipated over the cardan joint 21 and the joint member 19 to the brake disk 14. In order to apply the brake, pressurized oil is supplied to the brake cylinder 17 over line 23, whereby the brake or pressure disk 12 is displaced axially toward the right, as viewed in FIGURE 1, by means of the annular piston 18, and, consequently, the center brake disk 14 is braked between the outer brake disks 10a and 12. The quantity of heat produced thereby is conducted off by the cooling liquid which flows through the annularly shaped cooling jackets 11 and 13.

FIGURES 2 and 3 show a particularly advantageous installation of the brake system in accordance with the present invention into the wheel suspension. The brake shaft 22 is thereby connected by means of a further cardan joint 33, the center point of which coincides with the substantially vertical axis M of the steering pivot 34, with the wheel spindle 42 and forms the upper guide arm of the wheel, whereas the lower guide arm 36 is connected by means of a cross pivot pin 35 with a sleeve 34a on the steering pivot 34 and at 37 with the frame 40. As shown by FIGURE 2 the guide arms are parallel with each other.

The guide arms 22 and 36 are so disposed with reference to joints 21, 33 and pivots 35 and 37 as to form opposite sides of a link quadrilateral as viewed in FIGURE 2, one of the other two sides thereof being limited by joint 33 and pivot 35 and the other of the latter two sides being limited by joint 21 and pivot 37.

One or two helical coils 38 and 38' serve for purposes of spring suspending the wheels. The springs 38 and 38' support themselves, on the one hand, against the lower guide arm 36 and, on the other, against one or two abutment members 39 secured to the cross bearer 40 of the frame and are arranged laterally of the brake shaft 22 which serves as upper guide arm for the wheel suspension.

The wheel 41 is rigidly secured with the wheel spindle 42 which is connected with the brake shaft 22 by means of joint 33 and is supported in an appropriate manner in the housing 43 pivotal about the steering pin 34.

In the embodiment illustrated herein, the shaft 22, aside from its function as guide member or guide arm for the wheel, is solely a brake shaft. However, with driven wheels, the shaft 22 may simultaneously constitute the drive shaft. The engine indicated at 44 is preferably arranged at or near the axle, for example, behind the cooler (not illustrated).

In a particularly advantageous realization of the present invention the brake linings 15 consist of metallic disks, for example, grey cast iron, which are fused without seams with the cooled brake disks 10 and 12, preferably formed of aluminum, for example, by the Alfine process. The brake disk 14 which rotates with the wheel and which is located between the metallic brake linings 15, however, is provided with a brake lining made of the usual non-metallic material. This construction results in particularly favorable cooling conditions in that the heat produced during braking and transmitted directly by conduction from the metallic brake linings 15 to the cooled disks 10 and 12 may be passed on to and therewith carried off by the cooling medium which flows through the cooling spaces 11 and 13.

If so desired, the inner disk 14 may also be connected with the cooling system, for example, axially from the inside thereof, by hoses or the like.

While we have shown and described one preferred embodiment in accordance with the present invention, it is understood that the same is not limited thereto but is susceptible of many changes and modifications in accordance with the present invention and we intend to cover all such changes and modifications except as defined by the appended claims.

We claim:

1. A brake system for a vehicle wheel of a motor vehicle having a cooling system including a cooling fluid, a vehicle frame member, a spindle for said wheel, suspension means for said spindle and wheel supported by said frame member for guiding said spindle and wheel in up and down movements with respect to said frame member, said brake system comprising a disk brake including non-rotatable brake disk means and rotatable brake disk means between said non-rotatable disk means, said suspension means including a brake shaft, joint means connecting said wheel to said brake shaft, and further joint means connecting said brake shaft to said rotatable disk means, spaced spring means, means for supporting said spring means on said vehicle frame member, said brake shaft extending between said spaced spring means, said non-rotatable brake disk means forming cooling jackets, and means interconnecting said non-rotatable brake disk means into said cooling system to enable passage of said cooling fluid through said cooling jackets and thereby carry off the heat produced during braking, said brake shaft simultaneously forming a guide arm for said wheel.

2. A brake system for a motor vehicle according to claim 1, wherein said wheel is provided with a steering means including steering pivot means, said first-named joint means being intersected by the axis of said steering pivot means.

3. A brake for a ground wheel of a motor vehicle comprising a plurality of brake discs, said plurality including an axailly movable brake disc, a cardan joint, jointed shaft means connecting said cardan joint with said wheel for rotation therewith, said axially movable brake disc being mounted on a member of said cardan joint in slidable but non-rotative relationship thereto, a housing enclosing said joint and said disc, said plurality of brake discs further including a second brake disc engaging the interior of said housing in slidable and non-rotative relationship thereto and movable relatively axially in engaging relationship to said first-mentioned disc, a cooling means for said brake comprising a hollow space in the interior of at least one of said plurality of brake discs, and conduit means connecting said hollow space to a cooling system on said motor vehicle, a vehicle frame member, means supportnig said housing on said vehicle frame member, supporting means operably connecting said vehicle frame member and said wheel, said last-named supporting means including spring means and further including means cooperating with said spring means to guide said vehicle frame member in up-and-down movements with respect to said wheel.

4. A brake for a ground wheel according to claim 3, wherein said supporting means comprises a guide arm for said wheel disposed below said jointed shaft means, said jointed shaft means including means constituting a further guide arm for said wheel.

5. A brake for a ground wheel according to claim 3, wherein said cooling system is the liquid cooling system of the engine of the vehicle.

6. A brake for a ground wheel of a motor vehicle comprising a plurality of brake discs, said plurality including an axially movable brake disc, a cardan joint and jointed shaft means operatively connected with said wheel for rotation therewith, said axially movable brake disc being mounted on a member of said cardan joint in slidable but non-rotative relationship thereto, a housing enclosing said joint and said disc, said plurality of brake discs further including a second brake disc engaging the interior of said housing in slidable and non-rotative relationship thereto and movable relatively axially in engaging relationship to said first-mentioned disc, a cooling means for said brake comprising a hollow space in the interior of at least one of said plurality of brake discs, and conduit means connecting said hollow space to a cooling system on said motor vehicle, said plurality of discs further comprising a stationary brake disc, said second brake disc and said stationary brake disc being provided with metallic brake linings and said axially movable disc being provided with a non-metallic lining.

7. A brake for a ground wheel of a motor vehicle comprising a plurality of brake discs, said plurality including an axially movable brake disc, a cardan joint and jointed shaft means operatively connected with said wheel for rotation therewith, said axially movable brake disc being mounted on a member of said cardan joint in slidable but non-rotative relationship thereto, a housing enclosing said joint and said disc, said plurality of brake discs further including a second brake disc engaging the interior of said housing in slidable and non-rotative relationship thereto and movable relatively axially in engaging relationship to said first-mentioned disc, a cooling means for said brake comprising a hollow space in the interior of at least one of said plurality of brake discs, and conduit means connecting said hollow space to a cooling system on said motor vehicle, said plurality of brake discs further comprising a third disc in stationary relationship to said housing, said third disc having a hollow space therein operatively connected to the said cooling system of the vehicle.

8. A brake for a ground wheel of a motor vehicle comprising a plurality of brake discs, said plurality including an axially movable brake disc, a cardan joint and jointed shaft means operatively connected with said wheel for rotation therewith, said axially moving brake disc being mounted on a member of said cardan joint in slidable but non-rotative relationship thereto, a housing enclosing said joint and said disc, said plurality of brake discs further including a second brake disc engaging the interior of said housing in slidable and non-rotative relationship thereto and movable relaitvely axially in engaging relationship to said first-mentioned disc, a cooling means for said brake comprising a hollow space in the interior of said second brake disc, and conduit means connecting said hollow space to a cooling system on said motor vehicle, said housing being provided with an opening adjacent said second brake disc, said conduit means comprising a pipe received within said opening and connected to said second disc.

9. A brake system for a vehicle wheel of a motor vehicle having a cooling system including a cooling fluid, a vehicle frame member, a spindle for said wheel, suspension means for said spindle and wheel supported by said frame member for guiding said spindle and wheel in up and down movements with respect to said frame member, said brake system comprising a disk brake including non-rotatable brake disk means and rotatable brake disk means intermediate said non-rotatable brake disk means, at least one of said brake disk means comprising a cooling jacket, and means interconnecting said one of said brake disk means into said cooling system to enable passage of said cooling fluid through said cooling jacket and thereby carry off the heat produced during braking, a brake shaft, joint means connecting said wheel to said brake shaft and further joint means connecting said brake shaft to said rotatable brake disk means, said suspension means comprising two guide arms, one of said guide arms being constituted by said brake shaft and disposed above the other of said guide arms, said other of said guide arms having an operative connection with said wheel and spindle including pivotal connecting means and having a pivotal connection with said frame member, said joint means, said further joint means, said pivotal connecting means and said pivotal connection defining a link quadrilateral, said link quadrilateral including said guide arms.

10. A brake system according to claim 9, wherein said operative connection includes pivot means having a substantially vertical axis, the center of said first-named joint means coinciding with said axis.

11. A brake system for a vehicle wheel of a motor vehicle, said wheel being provided with means by which it may be steered, said motor vehicle having a cooling system including a cooling fluid, a vehicle frame member, suspension means for said wheel for guiding said wheel in up and down directions with respect to said frame member, said brake system comprising a disk brake including non-rotatable brake disk means and rotatable brake disk means disposed between said non-rotatable brake disk means, at least one of said brake disk means comprising means forming a cooling jacket, conduit means connecting said one of said brake disk means to said cooling system, a brake shaft subject to rotation only in consequence of rotation of said wheel, joint means connecting said wheel to said brake shaft and further joint means connecting said brake shaft to said rotatable brake disk means, said suspension means comprising two parallel guide arms, one of said guide arms being constituted by said brake shaft and being disposed above the other of said guide arms, means including pivot means connecting one end of said other of said guide arms to said wheel, and further pivot means connecting the other end of said other of said guide arms to said vehicle frame member.

References Cited in the file of this patent

UNITED STATES PATENTS

| | | |
|---|---|---|
| 1,972,353 | North et al. | Sept. 4, 1934 |
| 2,051,286 | Boykin | Aug. 18, 1936 |
| 2,127,557 | Ells | Aug. 23, 1938 |
| 2,133,652 | Best | Oct. 18, 1938 |
| 2,300,532 | Ash | Nov. 3, 1942 |
| 2,564,509 | Shelton | Aug. 14, 1951 |
| 2,623,613 | Booth | Dec. 30, 1952 |
| 2,821,271 | Sanford | Jan. 28, 1958 |

FOREIGN PATENTS

| | | |
|---|---|---|
| 701,725 | Great Britain | Dec. 20, 1953 |